US005586088A

United States Patent [19]

Vochezer

[11] Patent Number: 5,586,088

[45] Date of Patent: Dec. 17, 1996

[54] METRONOME MECHANISM

[75] Inventor: Georg Vochezer, Argenbühl-Christazhofen, Germany

[73] Assignee: Rudolf Wittner GmbH & Co., Isny, Germany

[21] Appl. No.: 501,121

[22] PCT Filed: Dec. 21, 1993

[86] PCT No.: PCT/EP93/03644

§ 371 Date: Aug. 9, 1995

§ 102(e) Date: Aug. 9, 1995

[87] PCT Pub. No.: WO94/18611

PCT Pub. Date: Aug. 18, 1994

[30] Foreign Application Priority Data

Feb. 12, 1993 [DE] Germany ........................ 43 04 177.9

[51] Int. Cl.[6] ........................ G04B 15/00; G09B 15/00

[52] U.S. Cl. ........................ 368/134; 84/484

[58] Field of Search ........................ 368/134; 84/484

[56] References Cited

U.S. PATENT DOCUMENTS

| | | | |
|---|---|---|---|
| 271,448 | 1/1883 | Greene et al. | 84/484 |
| 734,032 | 6/1903 | Adams | 84/484 |
| 1,664,010 | 3/1928 | Welch | 84/484 |
| 3,662,538 | 5/1972 | Wittner | 84/484 |
| 4,237,549 | 12/1980 | Harle | 368/134 |
| 4,333,172 | 6/1982 | Chen | 84/484 |

FOREIGN PATENT DOCUMENTS

| | | |
|---|---|---|
| 2636782 | 4/1977 | Germany . |
| 3440264 | 5/1986 | Germany . |

*Primary Examiner*—Bernard Roskoski

*Attorney, Agent, or Firm*—Shenier & O'Connor

[57] ABSTRACT

A metronome mechanism comprises a bearing frame with a web and two limbs protruding from the web, a winding stem carrying a spring housing, a ratchet wheel stem carrying a ratchet wheel and bearing bushes arranged on the limbs of the bearing frame for receiving the ends of winding and ratchet wheel stems. The bearing bushes are formed on two separate side parts which are adapted to be pushed onto the limbs of the U-shaped bearing frame and firmly locked on the limbs.

10 Claims, 4 Drawing Sheets

METRONOME MECHANISM

The invention relates to a metronome mechanism comprising a U-shaped bearing frame with a web and two limbs protruding from the web, a winding stem carrying a spring housing, a ratchet wheel stem carrying a ratchet wheel and bearing bushes arranged on the limbs of the bearing frame for receiving the ends of the winding and ratchet wheel stems.

In known metronome mechanisms of this kind (DE-AS 26 36 782), the bearing bushes for receiving the ends of the winding and ratchet wheel stems are arranged in the form of simple bores directly on the two limbs of the bearing frame made of sheet metal, and these stems bridge the space between the limbs. To enable the stem ends of the winding and ratchet wheel stems to be inserted into their bearing bushes, the limbs of the bearing frame have to be bent sideways and then bent back into their original position. This often results in deformations of the bearing frame, for example, in the limbs no longer protruding perpendicularly from the U-web of the frame which joins these. Frictional losses can occur as a result of this and impair the accuracy of the metronome mechanism. In addition, the bending open and back of the limbs of the bearing frame and the introduction of the stem ends has hitherto had to be carried out manually and could not be automated.

The object of the invention is to so improve a generic metronome mechanism that the ends of the winding and ratchet wheel stems can be mounted without bending the bearing frame.

The object is accomplished in accordance with the invention by the bearing bushes being formed on two separate side parts which are adapted to be pushed onto the limbs of the U-shaped bearing frame and firmly locked on the limbs.

The following description of a preferred embodiment of the invention serves to explain the invention in greater detail in conjunction with the attached drawings, in which FIG. 1 is a perspective view of a metronome mechanism from the right;

Figure 4:
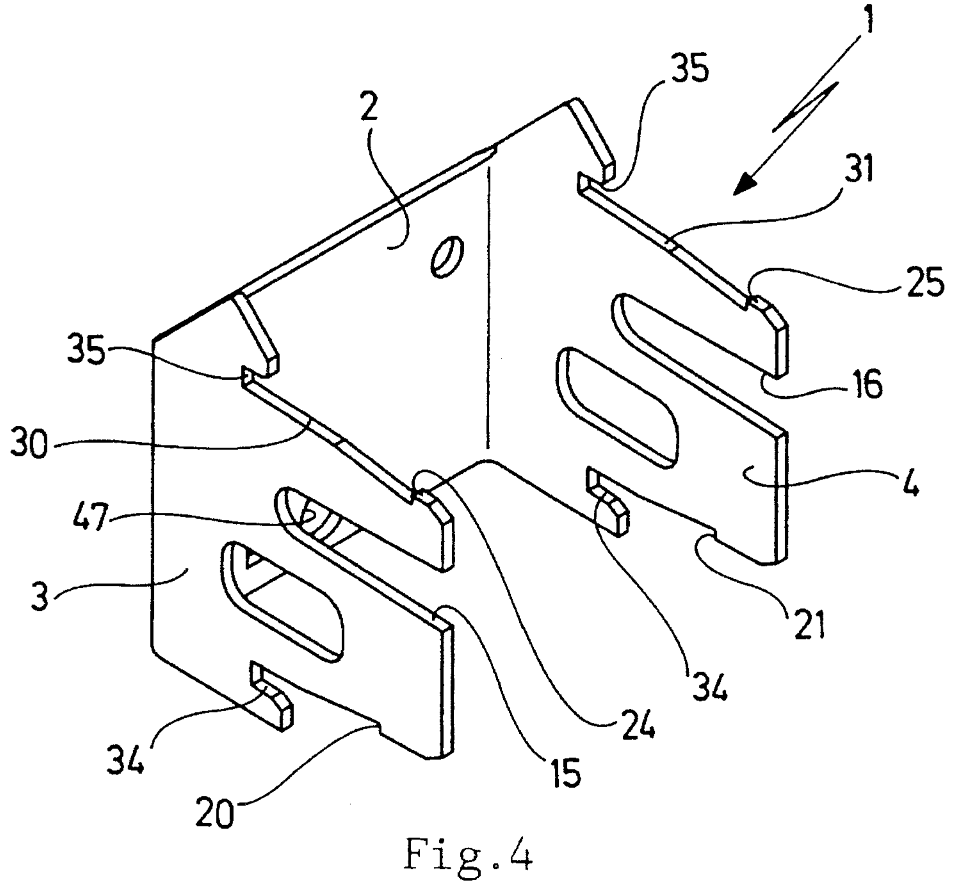
FIG. 4 is a detailed view of a U-shaped bearing frame.

FIG. 4 shows a U-shaped bearing frame 1 made of sheet metal with a web 2 and two limbs 3,4 protruding from this web. The limbs 3, 4 of the U-shaped bearing frames hitherto used in metronome mechanisms comprised bearing bushes in the form of bores into which the ends of a winding stem and a ratchet wheel stem were rotationally insertable, and these stems bridged the space between the two limbs 3, 4. To do so, the two limbs 3,4 had to be bent sideways to enable the ends of the aforementioned stems to be inserted into their bores. The limbs 3, 4 then had to be bent back into their original position again. It is obvious that inaccuracies could occur here and the limbs 3, 4 often failed to return to their correct initial position, which could adversely affect the running and the accuracy of the metronome mechanism.

Figure 5:
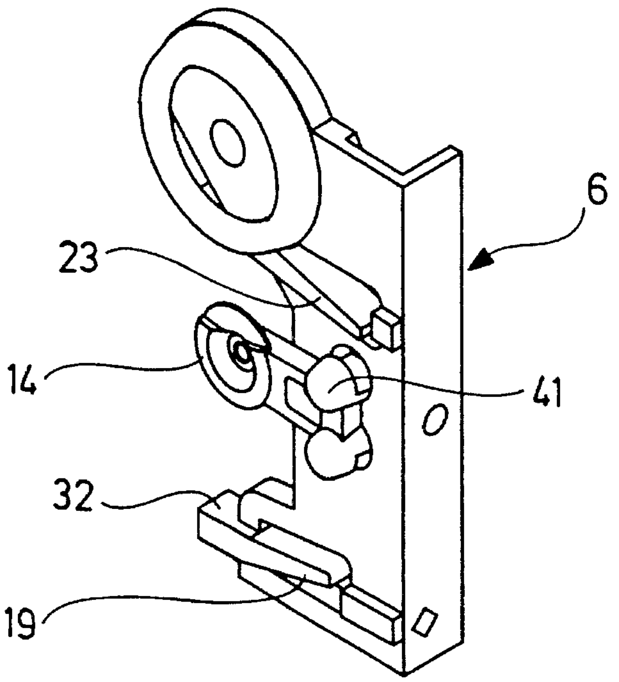
FIG. 5 is a perspective detailed view of a right side part.
Figure 6:
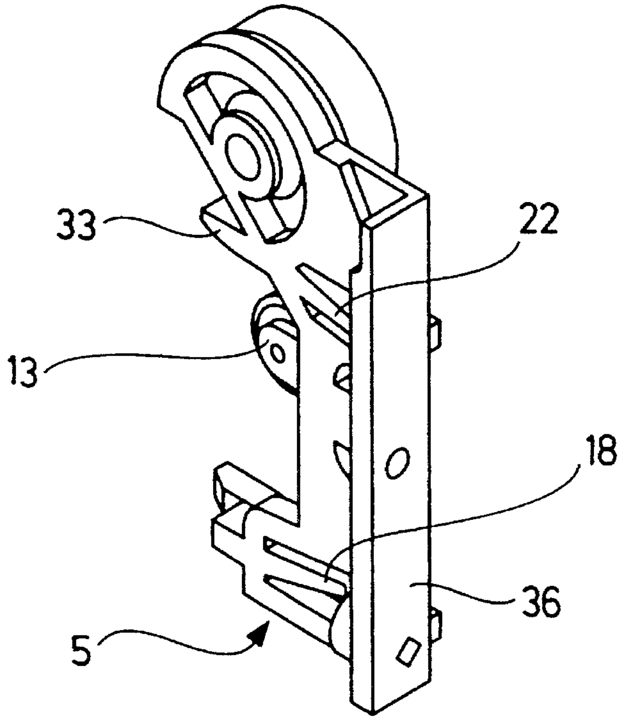
FIG. 6 is a perspective detailed view of a left side part.

To avoid bending of the limbs 3, 4 when mounting the winding and ratchet wheel stems, there are provided in accordance with the invention—cf., in particular, FIGS. 1 and 2—two side parts, namely a left side part 5 and a right side part 6, which in a manner described hereinbelow are pushable onto the free ends of the limbs 3, 4 of the bearing frame 1 and lockable thereon. The left side part 5 is illustrated in detail in FIG. 6, the right side part 6 in FIG. 5. There are formed on the left and right side parts 5, 6, in a manner which will likewise be described hereinbelow, bearing bushes which receive the ends of a winding stem 7 and a ratchet wheel stem 8, respectively. When assembling the metronome mechanism, the two side parts 5, 6 are first placed with their bearing bushes on the ends of the winding and ratchet wheel stems 7 and 8, respectively. The two side parts 5, 6 together with the stems carried by these are then pushed onto the limbs 3, 4 of the bearing frame 1. The two bearing bushes are arranged on the side parts 5, 6 such that when the side parts are pushed onto the limbs 3, 4 of the bearing frame 1, their end faces either run past these limbs or they enter slits in these limbs. In any case, the side parts 5, 6 together with the bearing bushes arranged on these can, in this way, be mounted at a constant spacing on the limbs 3, 4 without these having to be bent. Therefore, in principle, very accurate mounting can be carried out in this way with precisely specified spacing of the bearing bushes. A left bearing bush 9 for the left end of the winding stem 7 is formed on the left side part 5 such that when this side part 5 has been pushed onto the (left) limb 3 of the bearing frame 1, it comes to rest with its end face outside this limb 3 (cf., in particular, FIGS. 2 and 3). A right bearing bush 11 for the right end of the winding stem 7 is arranged in a corresponding way on the right side part 6 which is pushed onto the (right) limb 4 of the bearing frame 1. As is apparent, in particular, from FIG. 1, the winding stem 7 protrudes towards the right beyond the bearing bush 11 and carries a thread there (not illustrated) on which a winding screw serves, in the usual way, to tension a spring (not illustrated) which, for its part, is accommodated in a known manner in a spring housing 12 carried by the winding stem 7. As is apparent from FIG. 2, the left end of the winding stem 7 also protrudes quite far towards the left beyond the bearing bush 9 and so mounting of a securing ring on this stem to prevent the stem end from moving out of the bearing bush can be dispensed with. A left bearing bush 13 for the left end of the ratchet wheel stem 8 is formed substantially on the inner side of the left side part 5. Correspondingly, a right bearing bush 14 for the right end of the ratchet wheel stem 8—cf. FIG. 5—is substantially formed on the inner side of the right side part 6.

When the two side parts 5, 6 are pushed onto the associated limbs 3, 4, the bearing bushes 9, 11 and 13, 14, respectively, are held exactly at that spacing which is necessary for correct and easy mounting of the winding and ratchet wheel stems 7 and 8, respectively.

As is most clearly apparent from FIG. 4, there are formed on the limbs 3, 4 of the bearing frame 1 slit-shaped slide guideways 15, 16, respectively, which are open towards the free ends of the limbs 3, 4. The bearing bushes 13, 14 for the ratchet wheel stem 8 are inserted into these slide guideways 15, 16. For this purpose, the bearing bushes 13, 14 comprise guide members which are connected to these and ensure safe, substantially tolerance-free guidance of the bearing bushes 13, 14 in the slit-shaped slide guideways 15, 16. The edges 30, 31 of limbs 3, 4 at the top in FIG. 4 likewise form slide guideways for the bearing bushes 9, 11 of the winding stem 7, and, as is apparent from the drawings, flange-like portions are formed on these bearing bushes 9, 11, thereby overlapping the limbs 3, 4 and thus securing the bearing bushes 9, 11 in a firmly seated position on the limbs 3, 4.

Also formed on the side parts 5, 6 are resilient detent tongues 18, 19 which, after the side parts 5, 6 have been pushed onto the limbs 3, 4, snap in behind corresponding detent tongues 20 and 21, respectively, on the limbs 3, 4 (cf. FIG. 4) and thus fix the side parts 5, 6 on the limbs 3, 4. Further corresponding, resilient detent tongues 22, 23 are formed above the aforementioned detent tongues 18, 19 on the side parts 5 and 6, respectively, and snap in behind further detent tongues 24, 25 on the limbs 3, 4 of the bearing frame 1 (FIG. 4). This ensures that the side parts 5, 6 and hence the bearing bushes carried by these are held securely at the respective, precisely specified spacing on the bearing frame 1.

The side parts 5, 6 with the bearing bushes 9, 13 and 11, 14, respectively, arranged on these, are integrally formed by injection molding from highly resilient plastic which, at the same time, has good bearing properties for stem bearings. Polyacetal resin, for example, is a suitable plastic.

Figure 2:
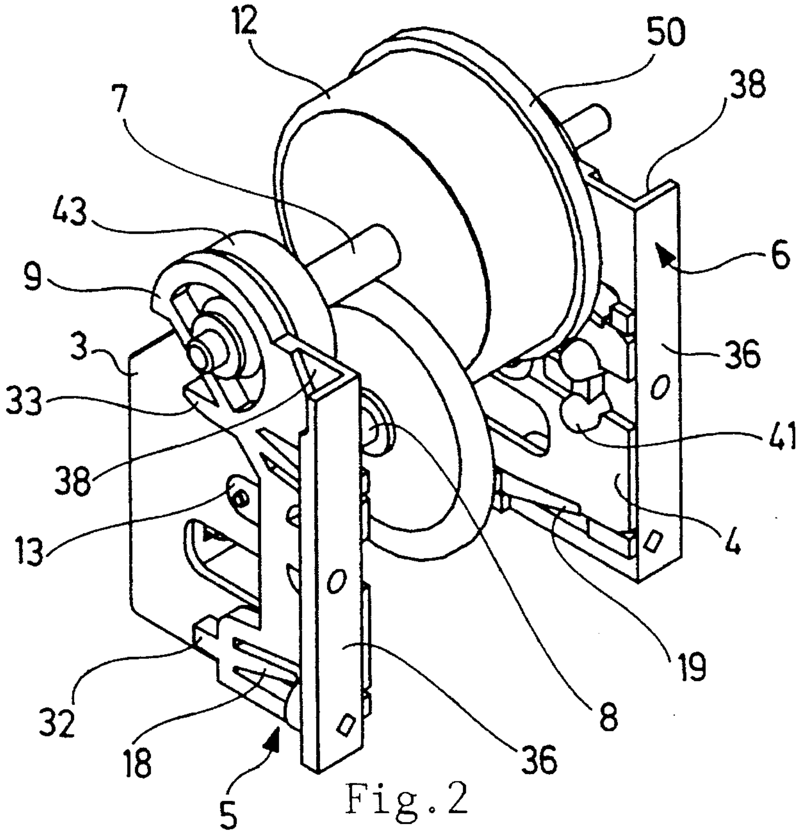
FIG. 2 shows the metronome mechanism of FIG. 1 from the left.
Figure 3:
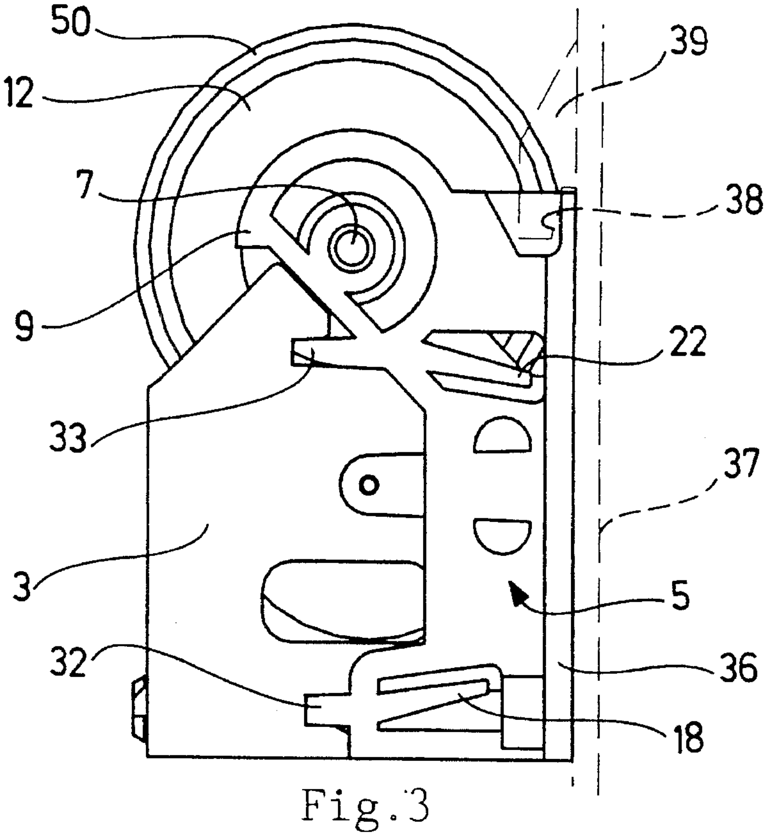
FIG. 3 is a side view of the metronome mechanism from the left.

As is also apparent from FIGS. 2 and 3, the side parts, for example, the left side part 5 illustrated in FIG. 3, comprise projections 32, 33 which engage in corresponding recesses 34 and 35, respectively, (cf. FIG. 4) on the limbs 3, 4 of the bearing frame 1, which further improves the fixing of the side parts 3, 4 in their position.

As illustrated, at their ends facing away from the web 2 of the bearing frame 1, the side parts 5, 6 further comprise mounting flanges 36 in the form of webs bent at right angles with which the metronome mechanism can be attached to a front plate 37—cf. FIG. 3—of a metronome. As shown, recesses 38 which can engage in corresponding anchor projections 39 on the front plate 37 (FIG. 3) are formed on one side of the mounting flanges 36. Apart from this, the mounting flanges 36 are attached to the front plate 37 in the conventional way by being screwed to it.

Figure 1:
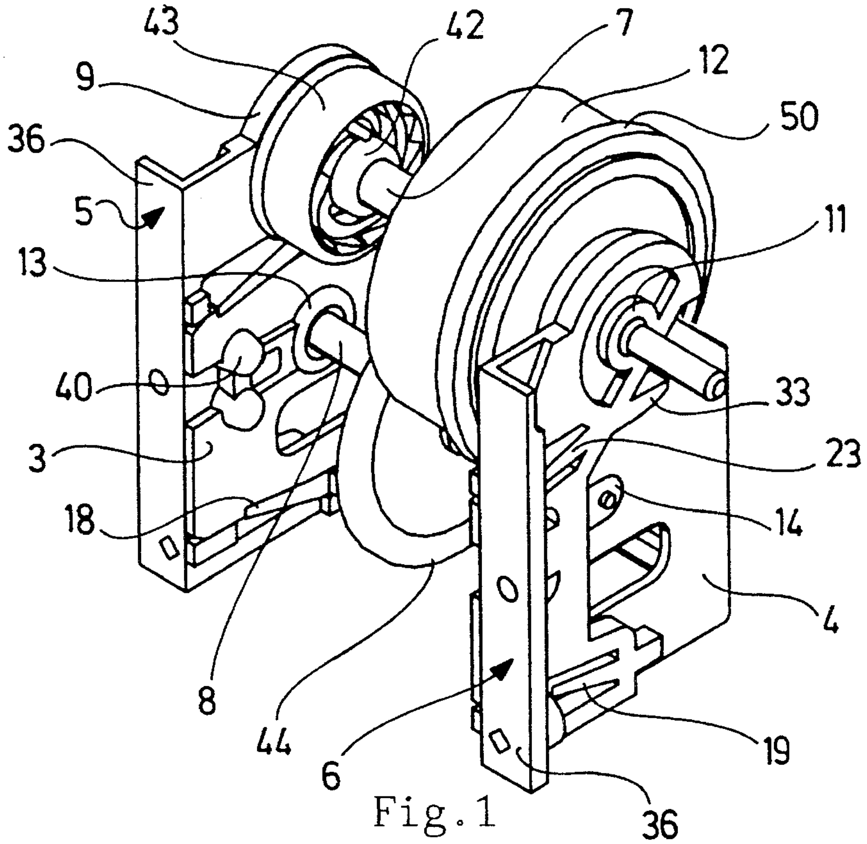

Finally, there are formed on the side parts 5, 6, as is apparent, in particular, from FIGS. 1 and 2, further guide cams 40, 41 which engage behind the slide guideways 15, 16 on both sides of the limbs 3, 4 and enable further exact guidance of the side parts 5, 6, and, in particular, define an exact axial spacing between the winding and ratchet wheel stems 7 and 8, respectively.

As is apparent, for example, from FIG. 1, the winding stem 7 carries a blocking part 42 which is firmly connected to it and, in the conventional manner, interacts with a stationary blocking part 43, the latter blocking part 43 being integrally formed on the left side part 5 in the proximity of the bearing bush 9. Such a blocking mechanism is described in, for example, DE-OS 34 40 264. In this way, separate manufacture of the blocking part 43 is dispensed with because it can be integrally formed by injection molding on the left side part 5.

The outer circumference of the spring housing 12 meshes by means of a toothing 50 in a manner known per se with a small pinion formed on the ratchet wheel stem 8 for rotational movement therewith. There is, furthermore, mounted, in a known manner, on the ratchet wheel stem 8 for rotational movement therewith the ratchet wheel 44 which in a likewise known manner interacts with an anchor stem (not illustrated) which extends perpendicularly to the winding stem 7 and the ratchet wheel stem 8.

Figure 7:
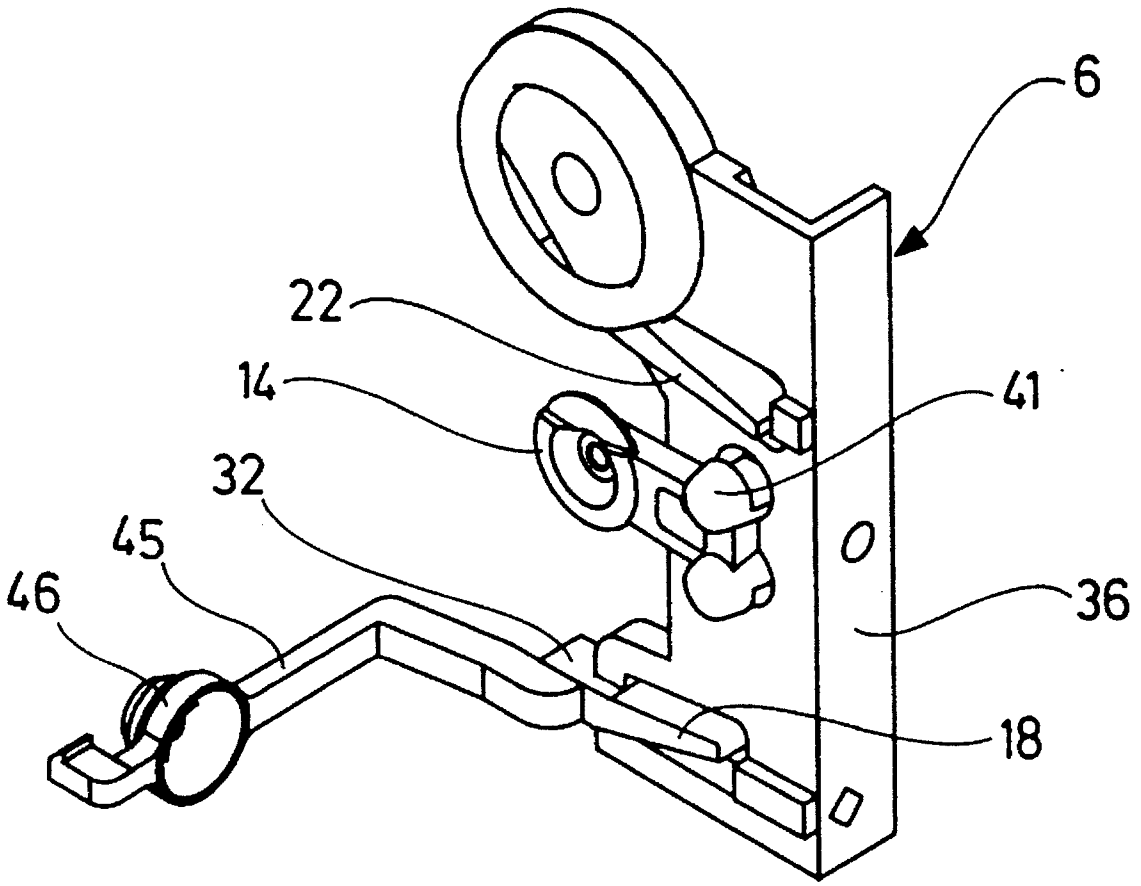
FIG. 7 shows the right side part of FIG. 5 with a bearing bush for an anchor stem arranged integrally on this part.

FIG. 7 shows a modification of the right side part 6. Herein there is integrally formed, in particular, by injection molding, on this side part 6 a cranked arm 45 which carries a bearing bush 46 for the anchor stem. The bearing bush 46 is fitted at its rear side into a recess 47 in the web 2 of the bearing frame 1 (cf. FIG. 4) and thereby fixed. The other end of the anchor stem is accommodated for rotational movement in a bearing bush arranged on the front plate 37 (FIG. 3).

The main advantage of the metronome mechanism described herein is that the side parts 5, 6 together with their bearing bushes can be positioned in a precisely fitting manner on the winding and ratchet wheel stems, respectively, and then pushed, likewise in a precisely fitting manner, onto the limbs 3, 4 of the bearing frame 1 and locked thereon. There are formed, in the conventional manner, on the stems 7, 8 by reduction of the diameter at the ends, steps which rest on the bearing bushes and prevent axial displacement of the stems 7, 8. A further advantage of the metronome mechanism described herein is that its assembly can be easily automated with the aid of the side parts carrying the bearing bushes.

I claim:

1. In a metronome comprising a U-shaped frame having a central portion and two terminal portions having respective axes disposed parallel to one another, a first shaft having two ends, a second shaft having two ends and cooperating means mounted on the first and second shafts for driving the metronome, the combination including a first member having a pair of bearings journalling one end of each of the first and second shafts, a second member having a pair of bearings journalling the other end of each of the first and second shafts, the construction of the members and the terminal portions being such that the respective members can be mounted on the respective terminal portions by sliding the members along paths parallel to the respective axes, and means for locking each member to its respective terminal portion.

2. A metronome as in claim 1 wherein the members are formed of a resilient plastic and the bearings are integrally formed in the members.

3. A metronome as in claim 2 wherein the members are made of polyacetal resin.

4. A metronome as in claim 1 wherein the locking means includes a pair of resilient tongues mounted on the respective members.

5. A metronome as in claim 1 wherein each terminal portion is formed with a slot extending parallel to its axis.

6. A metronome as in claim 5 wherein each member has a slide which rides in a corresponding slot.

7. A metronome as in claim 1 wherein each member is provided with a flange extending generally parallel to the central portion of the frame.

8. A metronome as in claim 1 further including means for preventing rotation of the first shaft in one direction, said preventing means including means integrally formed in one of the members.

9. A metronome as in claim 1 wherein one member has an integrally formed arm which extends parallel to the axes of the shafts.

10. A metronome as in claim 9 wherein the central portion of the frame is provided with a recess and wherein said arm includes a portion which fits into said recess.

* * * * *